(12) United States Patent
Zelmer

(10) Patent No.: US 7,401,389 B2
(45) Date of Patent: Jul. 22, 2008

(54) TONGUE INTERLOCKING DETACHABLE ANCHORAGE

(75) Inventor: Thomas H. Zelmer, Pontiac, MI (US)

(73) Assignee: Autoliv ASP, Inc., Ogden, UT (US)

( * ) Notice: Subject to any disclaimer, the term of this patent is extended or adjusted under 35 U.S.C. 154(b) by 195 days.

(21) Appl. No.: 11/170,213

(22) Filed: Jun. 29, 2005

(65) Prior Publication Data

US 2007/0000104 A1 Jan. 4, 2007

(51) Int. Cl.
*B60R 22/00* (2006.01)
(52) U.S. Cl. .......................... 24/633; 297/483; 280/808
(58) Field of Classification Search ....................... None
See application file for complete search history.

(56) References Cited

U.S. PATENT DOCUMENTS

| | | | |
|---|---|---|---|
| 4,702,491 A | 10/1987 | Meyer | 280/801 |
| 4,915,413 A | 4/1990 | Meyer | 280/801 |
| 5,403,038 A | 4/1995 | McFalls | 280/808 |
| 6,116,696 A | 9/2000 | Widman et al. | 297/483 |
| 6,338,502 B1 | 1/2002 | Czank | |
| 6,902,194 B2 | 6/2005 | Russell et al. | |

*Primary Examiner*—Jack W. Lavinder
(74) *Attorney, Agent, or Firm*—Sally J Brown; Stoel Rives LLP

(57) ABSTRACT

Disclosed are interlocking safety restraint mechanisms and safety restraint systems incorporating such mechanisms. Embodiments of the safety restraint mechanisms include a first locking mechanism adapted to receive and lock into place a buckle tongue and a second locking mechanism adapted to receive and lock into place an anchor tongue. The interlocking safety restraint mechanism is configured to automatically release the buckle tongue upon insertion of the anchor tongue and is further configured to automatically release the anchor tongue upon insertion of the buckle tongue.

18 Claims, 9 Drawing Sheets

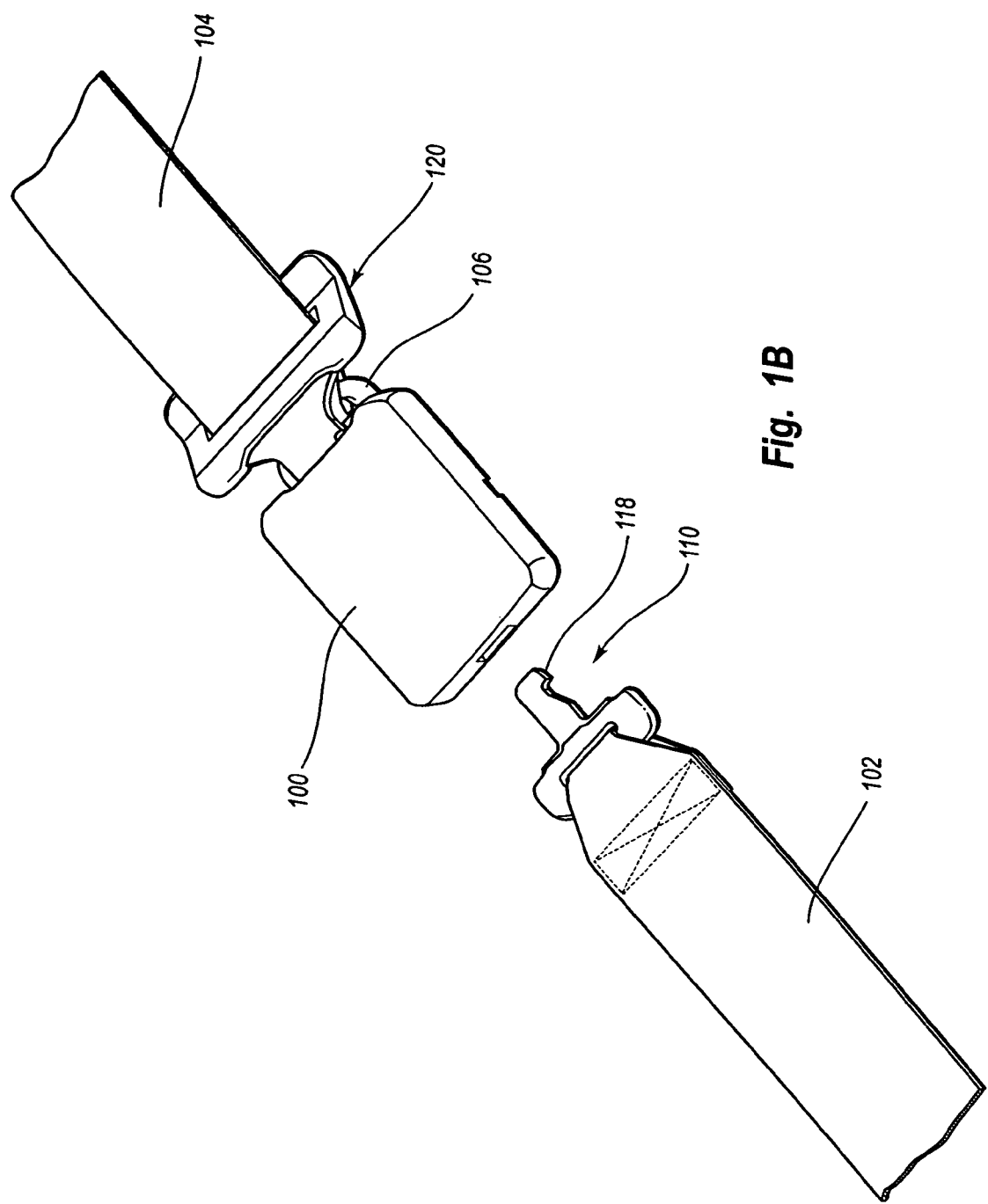

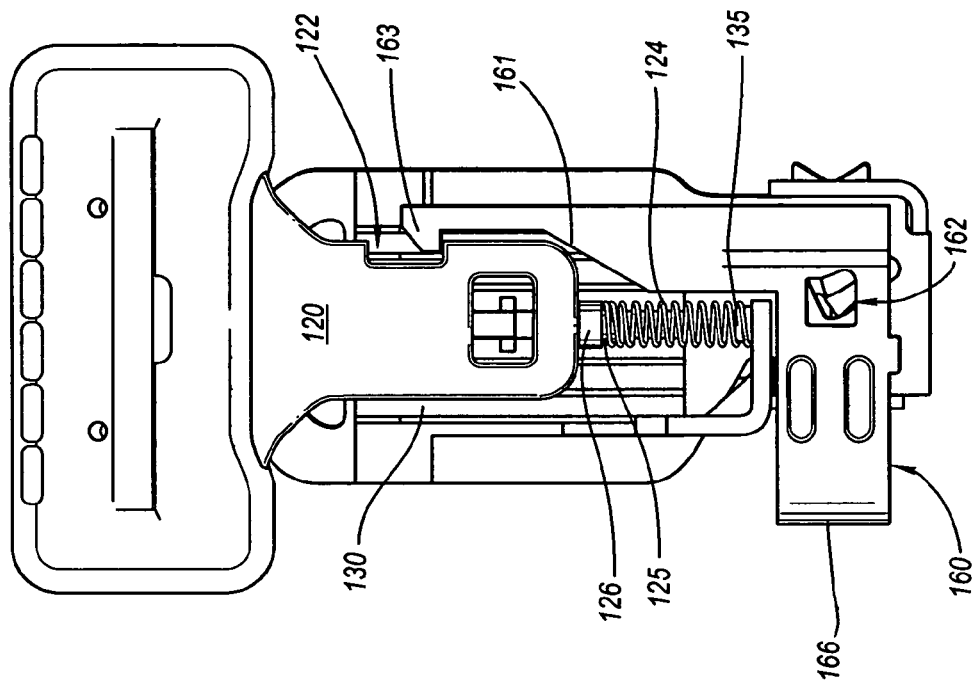
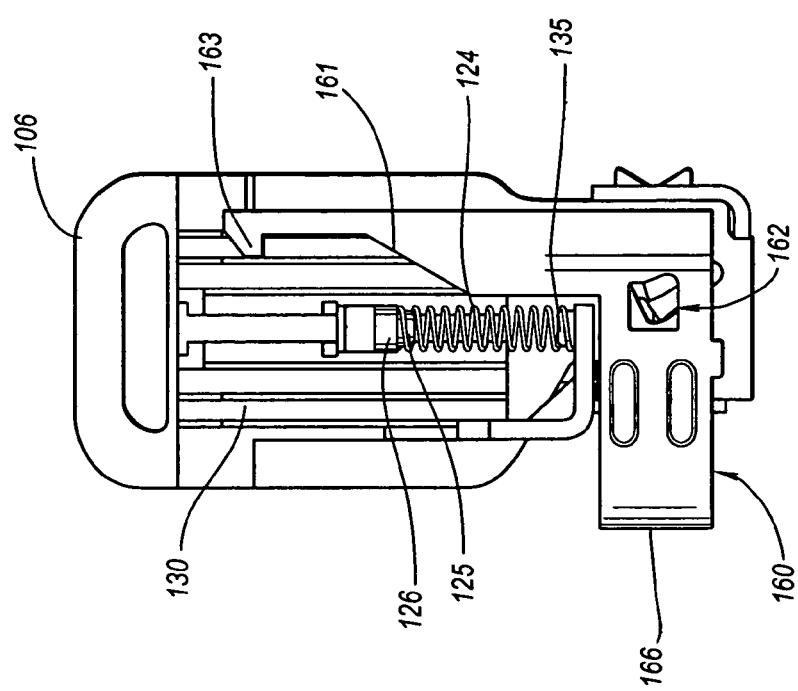
Fig. 4B
Fig. 4A

TONGUE INTERLOCKING DETACHABLE ANCHORAGE

TECHNICAL FIELD

The present invention relates generally to the field of automotive protective systems. More specifically, the present invention relates to seat belt and other safety restraint systems.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 1B is a perspective view of the safety restraint system shown in FIG. 1A as a buckle tongue is inserted into an interlocking buckle and an anchor tongue is ejected from the interlocking buckle.

FIGS. 4A-4B are cutaway views showing the locking components for the buckle tongue in greater detail.

DETAILED DESCRIPTION OF PREFERRED EMBODIMENT

Described below are embodiments of an interlocking safety restraint mechanism and embodiments of safety restraint systems incorporating an interlocking safety restraint mechanism. Embodiments of the interlocking safety restraint mechanism may include a first locking mechanism adapted to receive and lock into place a buckle tongue and a second locking mechanism adapted to receive and lock into place an anchor tongue. The interlocking safety restraint mechanism may be configured to automatically release the buckle tongue upon insertion of the anchor tongue and may likewise be configured to automatically release the anchor tongue upon insertion of the buckle tongue.

Safety restraint systems incorporating an interlocking safety restraint mechanism may include a buckle tongue, such as an adjustable tongue, slidably connected with a restraint belt. A fixed anchor tongue may be connected with the vehicle, along with a buckle adapted to receive the buckle tongue and lock the buckle tongue into place. A seat belt retractor adapted to receive the restraint belt may also be employed.

In operation, the occupant may pull the interlocking safety restraint mechanism (shown in the accompanying drawings as an interlocking buckle), which has the buckle tongue inserted therein, down to the fixed anchor tongue. The anchor tongue may then be attached to the interlocking buckle by inserting the anchor tongue into a slot in the interlocking buckle. Inserting the anchor tongue into the interlocking buckle automatically ejects the buckle tongue. The occupant may then pull the buckle tongue across his body and insert it into a fixed buckle typically positioned at or near the base of the car seat. A lap belt portion of the restraint belt is then created between the buckle and the interlocking buckle, while a shoulder belt portion is created between the retractor and the fixed buckle.

The system may then be detached and stored away by releasing the buckle tongue from the fixed buckle and inserting the buckle tongue into the interlocking buckle. Inserting the buckle tongue into the interlocking buckle automatically releases the anchor tongue from the interlocking buckle. The buckle tongue and interlocking buckle may then be retracted by retracting the restraint belt into the seat belt retractor. The foregoing system is described in greater detail in U.S. Pat. No. 6,116,696 titled "Interlocking Detachable Seat Belt System," which is hereby incorporated by reference in its entirety.

Figure 1A:
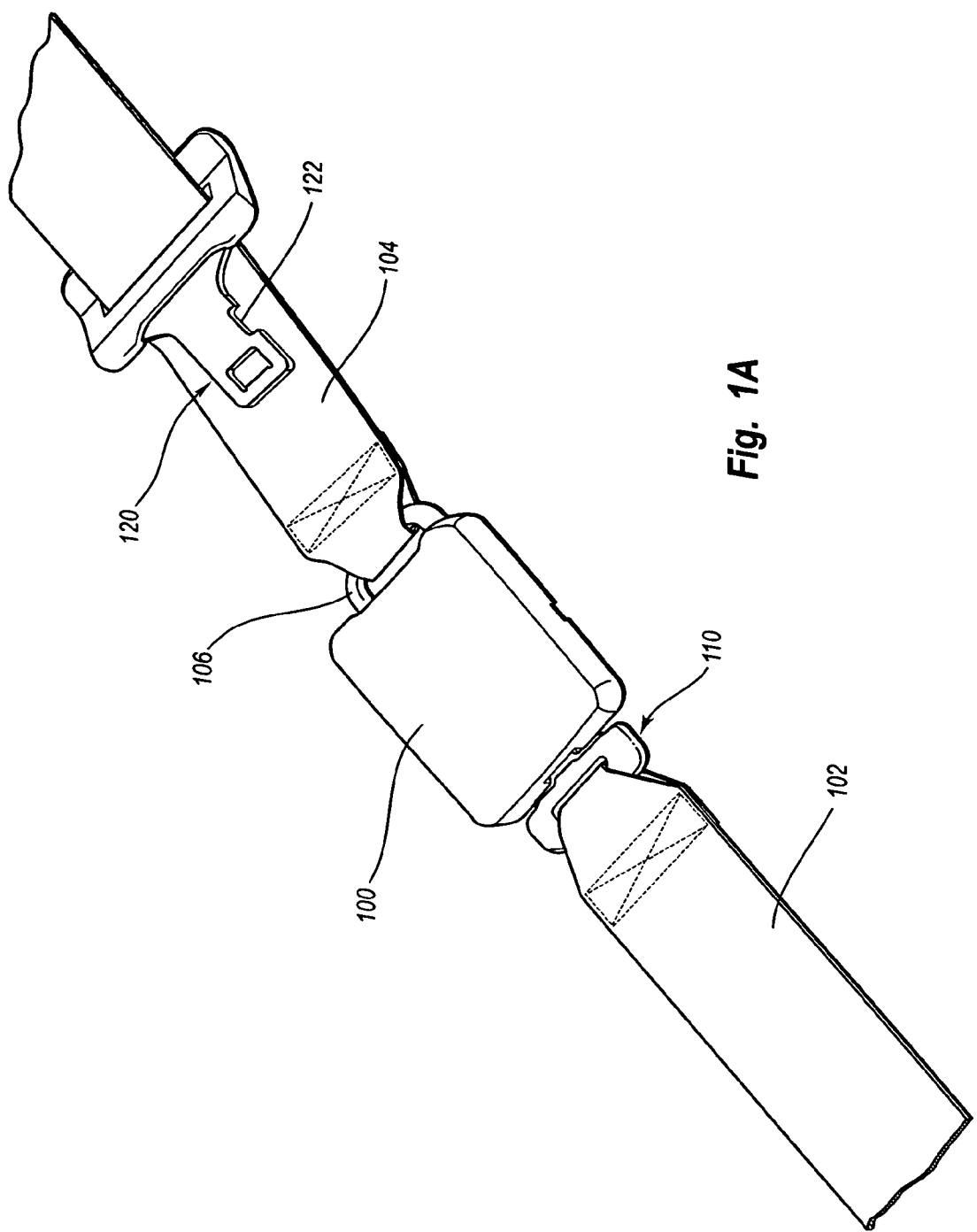
FIG. 1A is a perspective view of a safety restraint system.

Possible embodiments of the aforementioned apparatus and systems will now be described in greater detail with reference to the accompanying drawings. FIGS. 1A and 1B depict an embodiment of an interlocking mechanism at 100. These figures also depict an anchor restraint belt 102, an anchor tongue 110, a retractable restraint belt 104, a retractable restraint belt anchor 106, and a buckle tongue 120. Anchor restraint belt 102 may be attached to the vehicle and/or car seat at one end (not shown) and has anchor tongue 110 connected therewith at the opposite end.

Retractable restraint belt anchor 106 in the accompanying figures comprises a fixed loop attached at one end of the interlocking buckle 100. Retractable restraint belt 104 is connected to restraint belt anchor 106 at one end. In the depicted embodiment, retractable restraint belt 104 is permanently affixed to the interlocking buckle by threading the end of belt 104 through anchor 106 and affixing belt 104 to itself to form another loop.

Of course, those having ordinary skill in the art will appreciate that a variety of alternatives are possible. For instance, the retractable restraint belt anchor may instead comprise an anchor tongue, similar to anchor tongue 110. In such embodiments, interlocking buckle 100 may include three slots, rather than two. Optionally, the third slot adapted to receive the retractable restraint belt anchor (tongue) may be adapted to permanently affix the retractable restraint belt to the interlocking buckle. Alternatively, the third slot may be adapted to selectively affix the retractable restraint belt to the interlocking buckle by way of a button release system or the like. It should also be understood that the retractable restraint belt anchor may alternatively be positioned on the side of the interlocking buckle, or anywhere else on the interlocking buckle as desired. Buckle tongue 120 is slidably connected with retractable restraint belt 104 such that buckle tongue 120 can be moved up and down relative to retractable restraint belt 104.

In FIG. 1A, the system is shown with anchor tongue 110 inserted into a slot in interlocking buckle 100. In FIG. 1B, buckle tongue 120 is being inserted into a slot in the opposite end of interlocking buckle 100. As shown in FIG. 1B, anchor tongue 110 is automatically ejected or otherwise released upon insertion of buckle tongue 120. Likewise, upon insertion of anchor tongue 110, buckle tongue 120 is automatically ejected.

Figure 2A:
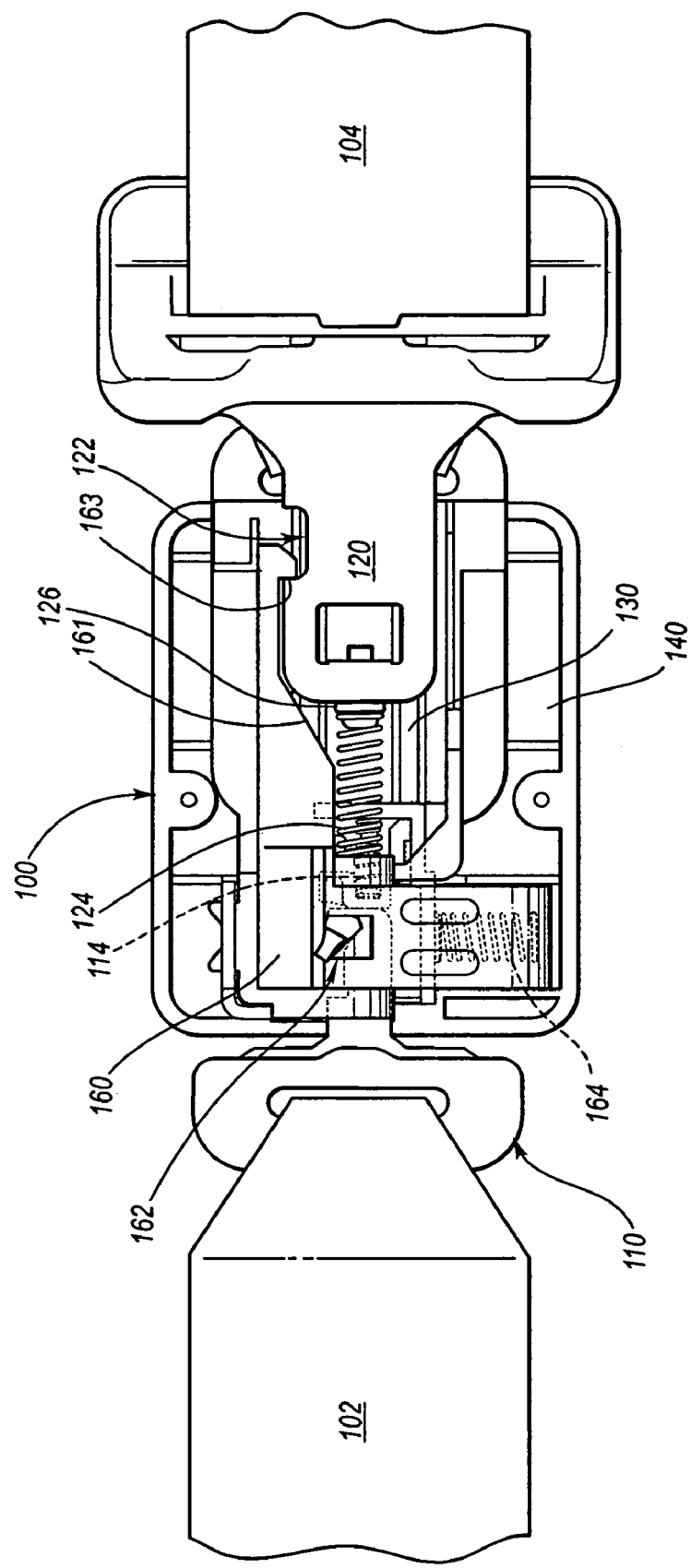
FIGS. 2A-2C are cutaway views of an interlocking buckle sequentially showing the insertion of a buckle tongue and associated ejection of an anchor tongue.
Figure 2B:
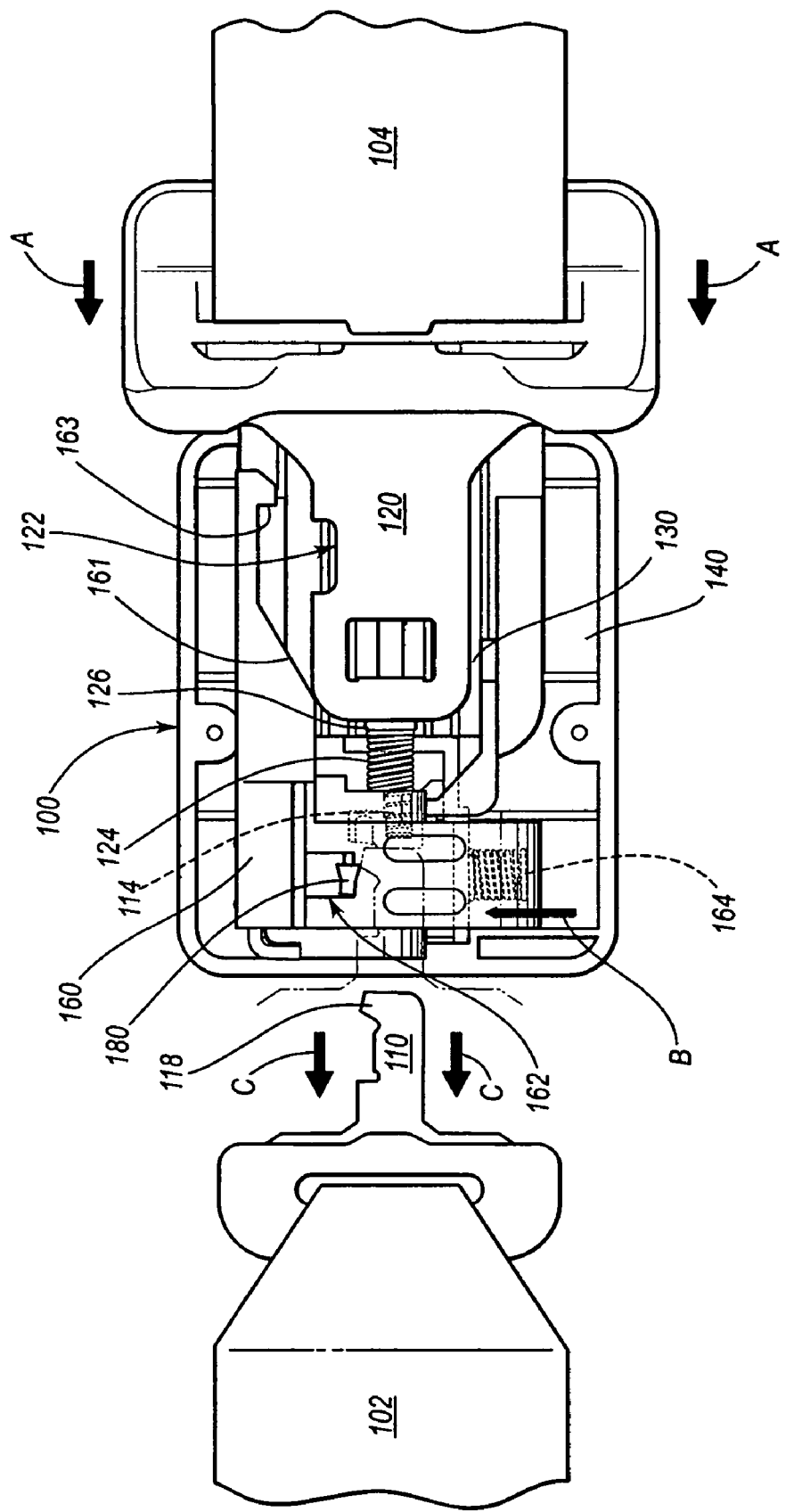
Figure 2C:
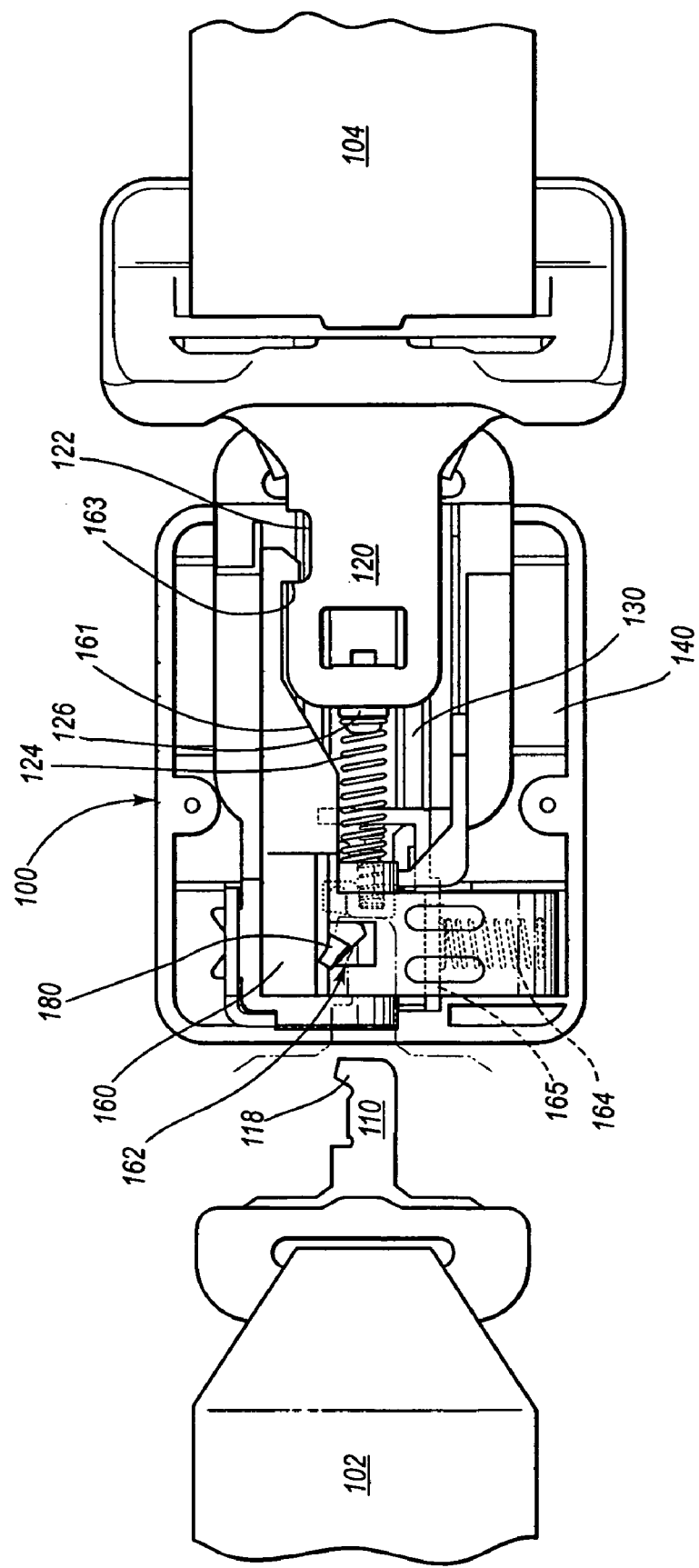
Figure 5:
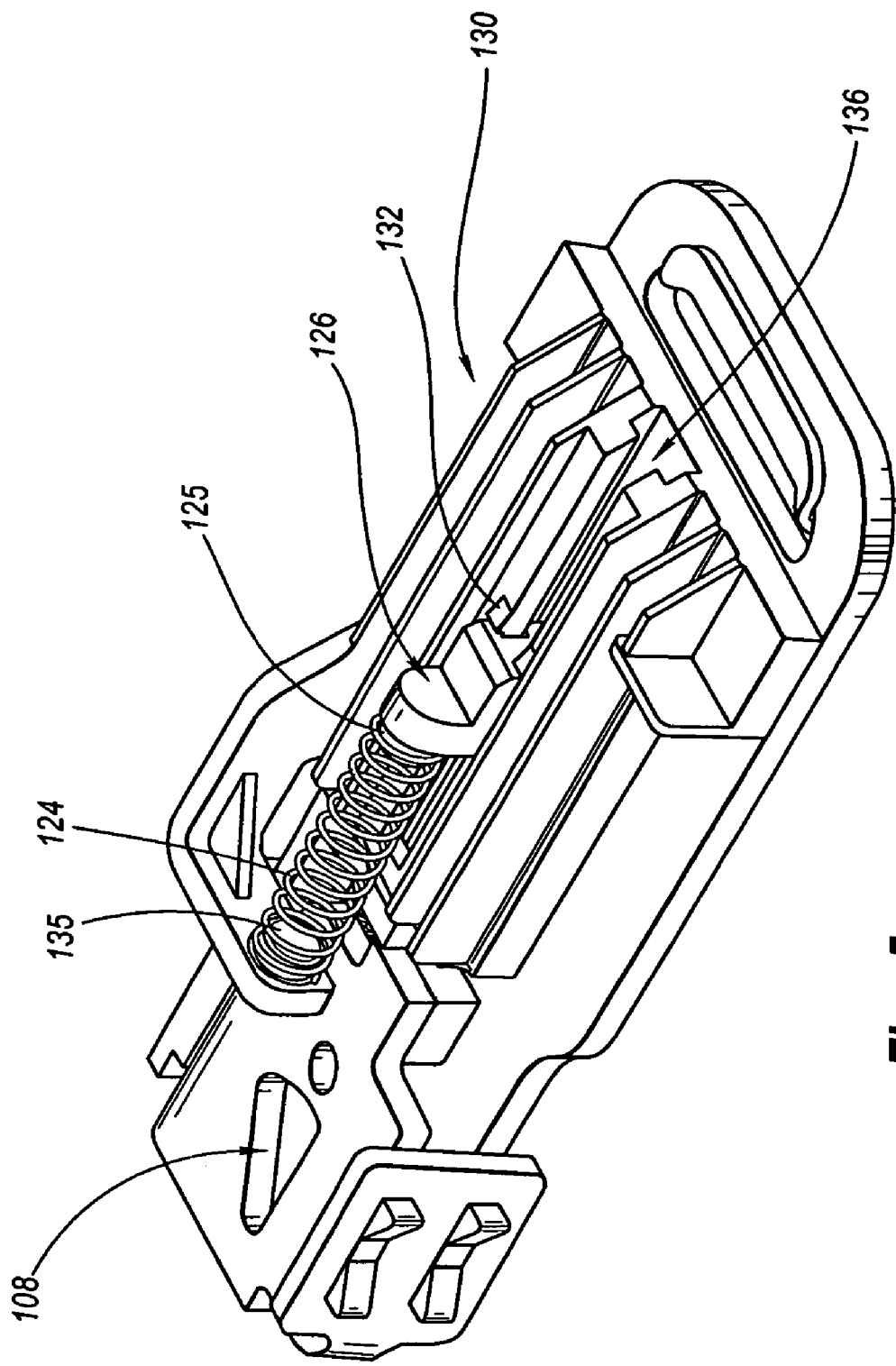
FIG. 5 is a perspective view showing some of the internal components of an embodiment of an interlocking buckle.
Figure 6:
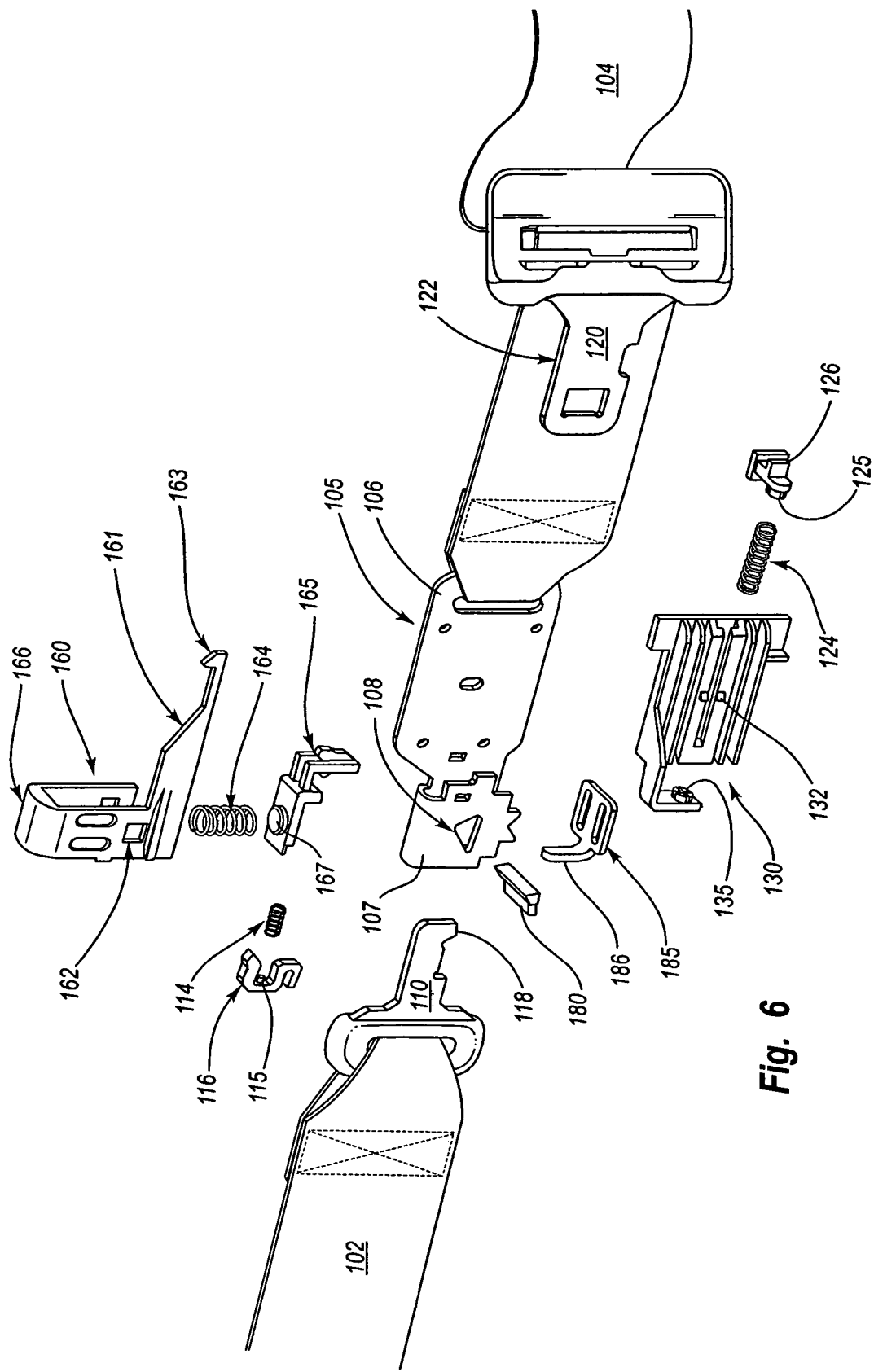
FIG. 6 is an exploded view showing each of the internal components of an embodiment of an interlocking buckle.

FIGS. 2A-2C each depict an embodiment of an interlocking safety restraint mechanism 100 in greater detail. FIG. 2A depicts buckle tongue 120 being inserted into interlocking buckle 100. Guide 130, which is best seen in FIG. 5 and FIG. 6, guides and facilitates insertion of buckle tongue 120. Cover 140 is shown partially broken away to reveal the interior components of interlocking buckle 100. An interior portion of cover 140 may also be used to guide buckle tongue 120 in some embodiments.

Button structure 160 is one of the primary structures which allow interlocking buckle 100 to function in such a way that insertion of buckle tongue 120 automatically releases anchor tongue 110, and vice versa. In the depicted embodiment, insertion of buckle tongue 120 automatically ejects anchor tongue 110, and vice versa. However, embodiments are contemplated in which insertion of buckle tongue 120 merely releases, rather than ejects, anchor tongue 110, and vice versa.

Button structure 160 includes an angled surface 161, a window opening 162, and a hook portion 163. As best seen in FIG. 6, button structure 160 also includes button collar 166, which is a domed portion adapted to receive button spring 164 therein. Button collar 166 also fits over button base 107, which will be discussed in greater detail infra. Window opening 162 extends through both sides of button collar 166. Button spring 164 biases button structure 160 towards the bottom from the perspective of the view in FIGS. 2A-2C. Thus, as buckle tongue 120 is inserted (represented by arrow A in FIG. 2B), buckle tongue 120 contacts angled surface 161 of button structure 160, thereby moving button structure 160 up (from the perspective of FIGS. 2A-2C), as represented by arrow B in FIG. 2B.

As will be described in greater detail later, a portion of latch 180 extends through window opening 162 so as to allow latch 180 to operate in conjunction with button structure 160. At times when neither of the buckle tongues are being inserted into the interlocking buckle 100, the interaction of window opening 162, latch 180, and button structure 160 (in conjunction with button spring 164) keeps latch 180 biased against the top (from the perspective of FIGS. 2A-2C) of window opening 162. This also allows latch 180 to maintain pressure against hooked portion 118 of anchor tongue 110, thereby keeping anchor tongue 110 locked inside interlocking buckle 100.

The motion indicated by arrow B in FIG. 2B may be continued until the bottom (from the perspective of the figure) edge of window opening 162 contacts latch 180. Further movement of button structure 160 releases latch 180 from its engagement with hooked portion 118 of anchor tongue 110, thereby allowing anchor spring 114 and anchor ejector 116 (see FIGS. 3A, 3B, and 6) to push anchor tongue 110 out of interlocking buckle 100 (represented by arrow C in FIG. 2B). It should be noted that the anchor spring may be removed or replaced with a weaker spring in embodiments in which the anchor tongue is automatically released, but not ejected, upon insertion of an adjustable tongue or other buckle tongue. As can been seen in FIG. 2B, button structure 160 has been fully pushed up and anchor tongue 110 has been ejected from interlocking buckle 100. Once anchor tongue 110 has been ejected, buckle tongue spring 124 forces buckle tongue 120 backwards, or in the direction away from button structure 160, via buckle tongue ejector 126. Buckle tongue 120 eventually locks into place by engaging tongue cutout portion 122 with button hook portion 163, as shown in FIG. 2C. In this state, tongue spring 124 remains slightly compressed and therefore provides a force to buckle tongue 120 to maintain contact between tongue cutout portion 122 and button hook portion 163, thereby keeping buckle tongue 120 from sliding further into the interlocking buckle 100.

After buckle tongue 120 is positioned and locked in interlocking buckle 100, insertion of anchor tongue 110 causes latch 180 to rotate (up from the perspective of the view in FIGS. 2A-2C). Latch 180 in turn contacts the upper edge of window opening 162, thereby transferring the force applied to latch 180 to button structure 160, and thereby moving button structure 160 in the same direction. Once latch 180 has been rotated sufficiently to allow anchor tongue 110 to be captured, button structure 160 moves up and away from buckle tongue 120 so as to disengage tongue cutout portion 122 from button hook portion 163. Once cutout portion 122 has been disengaged from hook portion 163, buckle tongue spring 124 pushes buckle tongue 120 out of interlocking buckle 100.

Figure 3A:
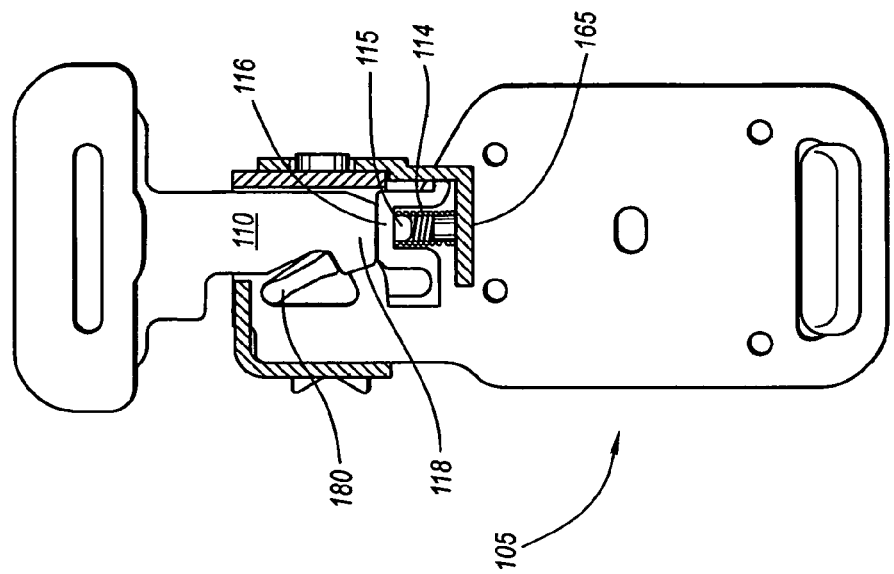
FIGS. 3A-3B are cutaway views showing the locking components for the anchor tongue in greater detail.
Figure 3B:
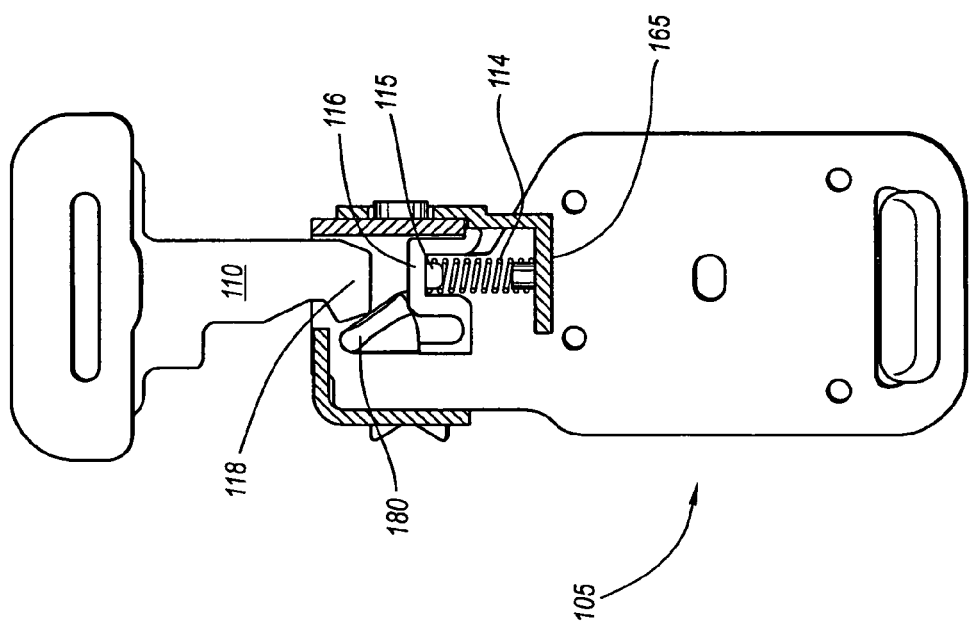

With reference now to FIGS. 3A and 3B, the locking components for the anchor tongue will be shown and discussed in greater detail. The anchor ejector 116 slides within the U-shaped portion (button base 107; not shown in FIGS. 3A-3B) of the frame 105. The anchor spring 114 is connected at one end to a projection (anchor spring post 115) on the anchor ejector 116. Anchor spring 114 may be attached at its opposite end to another projection (spring post) on the button spring holder 165. Anchor spring 114 compresses and extends as anchor ejector 116 slides in (towards button spring holder 165) and out (away from button spring holder 165), respectively.

Button spring holder 165 is fixed to the frame 105 adjacent to button base 107. When the anchor tongue 110 is inserted into the mechanism, as shown in FIG. 3A, it contacts the anchor ejector 116 and pushes it in, thus compressing the anchor spring 114. The latch 180 then locks anchor tongue 110 into place within the interlocking buckle 100, as shown in FIG. 3B. When the latch 180 is rotated out of the way (by the force of inserting buckle tongue 120 being transferred to button structure 160, as described above) the compressive spring force moves the anchor ejector 116, and thus anchor tongue 110, out of the interlocking mechanism. Anchor ejector 116 is prevented from exiting the frame 105 when it contacts the frame 105, as shown in FIG. 3A.

With reference now to FIGS. 4A, 4B, and 5, the locking components for the buckle tongue will be shown and discussed in greater detail. In the latched position, as shown in FIG. 4B, buckle tongue spring 124 is slightly compressed, which facilitates maintaining the engagement between cutout portion 122 and button hook portion 163. When the cutout portion 122 is disengaged from button hook portion 163, buckle tongue 120 is free to be ejected from interlocking buckle 100. Buckle tongue spring 124 may then push buckle tongue ejector 126, which in turn pushes the buckle tongue 120 out of the mechanism. As best seen in FIG. 5, the buckle tongue ejector 126 fits and slides within a T-shaped slot 136 in guide 130 that mates with the shape of buckle tongue ejector 126. Buckle tongue ejector 126 is prevented from being removed from guide 130 by projections 132 formed along a portion of the slot 136 in guide 130 in which buckle tongue ejector 126 fits.

With reference now to FIG. 6, in which an exploded view of the components of interlocking buckle 100 is presented, further details of an embodiment of the invention will now be described. Interlocking buckle frame 105 is connected to retractable restraint belt 104 at retractable restraint belt anchor 106. Frame 105 also includes button base 107. Button base 107 is U-shaped. Button base 107 has latch window 108 formed therein and is designed to support latch 180. Button base 107 has latch windows 108 formed in both sides of the U shape. However, it should be understood that some embodiments may only include a latch window in one side of button base 107. In other embodiments, the frame may not include a U-shaped portion, such that only a single latch window may be provided.

Tie bar structure 185 assists in providing strength to the internal structure of interlocking buckle 100 and further assists in maintaining the U shape of button base 107 on frame 105. Tie bar spacer 186 of tie bar structure 185 fits within the opening created by the U shape in button base 107. Tie bar spacer 186 thereby creates and maintains the proper size of the opening to guide the anchor tongue into its latched position.

Latch 180 is pivotably positioned within latch window 108. One end of latch 180 may be rounded and may fit within a matching slot within latch window 108 in order to allow latch 180 to pivot. The other end of latch 180 may include one or more protrusions that extend beyond the width of the pivoting end or may otherwise be wider than the pivoting end. In this manner, the protrusions or wider portion extend out of latch window 108. This allows rotation of latch 180 to cause movement of button structure 160, as described below in more detail.

Button collar 166 of button structure 160 fits over button base 107. Window opening 162 then may be positioned to coincide or at least partially overlap with latch window 108. The protrusions or wider portion of latch 180 therefore extend out of window opening 162 as well as latch window 108. This allows force from the insertion of anchor tongue 110 to be transmitted to button structure 160 through latch 180 and thereby release buckle tongue 120. Button spring 164 is used to bias button structure 160 towards the position where button hook portion 163 locks buckle tongue 120 inside interlocking buckle 100. Button spring 164 is held in place by button spring holder 165, which is positioned immediately adjacent to button structure 160. Button spring 164 may be fixedly attached to button spring holder 165 or, alternatively, it may fit within a groove in button spring holder 165 or otherwise be connected therewith. In the embodiment shown in FIG. 6, button spring 164 is connected with button spring holder 165 by fitting button spring 164 over button spring post 167.

Anchor tongue 110 is locked into place within interlocking buckle 100 by anchor tongue hook portion 118 engaging latch 180. Thus, insertion of anchor tongue 110 repositions button structure 160 until anchor tongue hook portion 118 passes over the end of latch 180, at which point latch 180 snaps and locks into anchor tongue hook portion 118. As can now be appreciated, in the embodiment of the invention depicted in the accompanying figures, the button structure is configured to be moved in the same direction whenever either the buckle tongue or the anchor tongue is inserted into the interlocking buckle in order to facilitate ejecting one tongue upon insertion of the other.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claim is:

1. A safety restraint system, comprising:
   a restraint belt;
   a buckle tongue slidably connected with the restraint belt;
   a fixed anchor tongue adapted to be connected with a vehicle;
   a buckle adapted to be connected with the vehicle and adapted to receive the buckle tongue and lock the buckle tongue into place; and
   an interlocking buckle adapted to receive and lock into place the buckle tongue, and adapted to receive and lock into place the anchor tongue, wherein the interlocking buckle comprises a button structure, wherein the button structure is movable inside the interlocking buckle, and wherein the button structure is configured to be moved when the buckle tongue is inserted into the interlocking buckle, and wherein the interlocking buckle is configured to automatically release the buckle tongue upon insertion of the anchor tongue and is configured to automatically release the anchor tongue upon insertion of the buckle tongue.

2. The safety restraint system of claim 1, wherein the interlocking buckle is configured to automatically eject the buckle tongue upon insertion of the anchor tongue and is configured to automatically eject the anchor tongue upon insertion of the buckle tongue.

3. The safety restraint system of claim 1, wherein the restraint belt is permanently affixed to the interlocking buckle.

4. The safety restraint system of claim 1, wherein the interlocking buckle includes three slots, each of which is adapted to receive and lock into place a tongue.

5. The safety restraint system of claim 4, further comprising a belt tongue connected to the restraint belt at one end of the restraint belt, wherein one of the three slots is adapted to receive and lock into place the belt tongue.

6. The safety restraint system of claim 5, wherein the slot adapted to receive the belt tongue is positioned adjacent to a slot adapted to receive the buckle tongue.

7. The safety restraint system of claim 1, wherein the button structure is configured to be moved when the anchor tongue is inserted into the interlocking buckle.

8. The safety restraint system of claim 7, wherein the button structure is configured to move in the same direction when the anchor tongue is inserted as when the buckle tongue is inserted.

9. The safety restraint system of claim 1, wherein the button structure includes an angled surface designed to facilitate moving the button structure upon insertion of the buckle tongue.

10. The safety restraint system of claim 1, wherein the interlocking buckle further comprises a latch, and wherein the button structure includes an opening configured and positioned to receive the latch.

11. The safety restraint system of claim 1, wherein the button structure includes a hook portion configured to lock the buckle tongue in the interlocking buckle.

12. The safety restraint system of claim 11, wherein the buckle tongue includes a cutout portion configured to abut with the hook portion to lock the buckle tongue in the interlocking buckle.

13. The safety restraint system of claim 1, wherein the interlocking buckle further comprises a spring positioned in the interlocking buckle to facilitate ejecting the buckle tongue upon insertion of the anchor tongue.

14. The safety restraint system of claim 13, wherein the spring also facilitates ejecting the anchor tongue upon insertion of the buckle tongue.

15. The safety restraint system of claim 1, further comprising a seat belt retractor adapted to receive the restraint belt.

16. A safety restraint system, comprising:
   a restraint belt;
   a buckle tongue slidably connected with the restraint belt;
   a fixed anchor tongue adapted to be connected with a vehicle;
   a buckle adapted to be connected with the vehicle and adapted to receive the buckle tongue and lock the buckle tongue into place; and an interlocking buckle adapted to receive and lock into place the buckle tongue, and adapted to receive and lock into place the anchor tongue, wherein the interlocking buckle is configured to automatically eject the buckle tongue upon insertion of the anchor tongue and is configured to automatically eject the anchor tongue upon insertion of the buckle tongue, wherein the interlocking buckle comprises a button structure movable inside the interlocking buckle, wherein the button structure is configured to be moved in the same direction whenever either the buckle tongue or the anchor tongue is inserted into the interlocking buckle.

17. A safety restraint system, comprising:

a restraint belt;

a buckle tongue slidably connected with the restraint belt;

a fixed anchor tongue adapted to be connected with a vehicle;

a buckle adapted to be connected with the vehicle and adapted to receive the buckle tongue and lock the buckle tongue into place; and an interlocking buckle adapted to receive and lock into place the buckle tongue, and adapted to receive and lock into place the anchor tongue, wherein the interlocking buckle is configured to automatically release the buckle tongue upon insertion of the anchor tongue and is configured to automatically release the anchor tongue upon insertion of the buckle tongue, and wherein the interlocking buckle comprises a spring positioned in the interlocking buckle to facilitate ejecting the buckle tongue upon insertion of the anchor tongue.

18. The safety restraint system of claim 17, wherein the spring also facilitates ejecting the anchor tongue upon insertion of the buckle tongue.

* * * * *